United States Patent [19]
Conroy, Jr. et al.

[11] Patent Number: 5,526,656
[45] Date of Patent: Jun. 18, 1996

[54] METHOD OF PRODUCING A FIBER STRING HAVING A PLURALITY OF TUFTS EXTENDING OUTWARDLY THEREFROM

[75] Inventors: John J. Conroy, Jr.; James Macaulay, both of Cumberland, R.I.

[73] Assignee: Providence Braid Company, Inc., Pawtucket, R.I.

[21] Appl. No.: 327,194

[22] Filed: Oct. 21, 1994

[51] Int. Cl.⁶ .............................. D04B 23/08; D06Q 1/02
[52] U.S. Cl. ................... 66/193; 66/202; 28/168
[58] Field of Search ................... 28/168; 66/193, 66/202, 83

[56] References Cited

U.S. PATENT DOCUMENTS

| | | | |
|---|---|---|---|
| 1,860,314 | 5/1932 | Mendel | 28/168 X |
| 2,652,705 | 9/1953 | Weinberg | 66/193 |
| 3,757,541 | 9/1973 | Fröhlich | 28/168 X |
| 4,370,871 | 2/1983 | Nakagaki et al. | 66/202 |
| 4,422,930 | 12/1983 | Hatanaka | 210/150 |
| 4,527,404 | 7/1985 | Nakagaki et al. | 66/202 |
| 5,353,486 | 11/1994 | Schmidt et al. | 28/168 X |

FOREIGN PATENT DOCUMENTS 2297277 9/1976 France ...................... 28/168

OTHER PUBLICATIONS

Pile Fabric Knitting: Knitting International, Sep. 1974.
Ring Lace Brochure; High Rate Biological Filtration Elements for Sewage & Wastewater Treatment.
Nitivy Company Limited Brochure, Salvron Export Division; Oct. 1989.

*Primary Examiner*—John J. Calvert
*Attorney, Agent, or Firm*—Salter & Michaelson

[57] ABSTRACT

A fiber string having a plurality of loops extending outwardly therefrom is formed by knitting a loop pile fabric with non-soluble and soluble yarns and then dissolving the soluble yarns in a solution to release the knitted loops. The loop pile fabric includes a central rib, or backbone, knitted from a plurality of non-soluble yarns, a plurality of loops knitted into the central rib such that terminal ends thereof extend outwardly from opposite sides of the central rib, and a strip of retaining fabric respectively knitted into the terminal ends of the loops on each side of said central rib. The loops are knitted from a plurality of non-soluble yarns, and the strips of retaining fabric are knitted from a plurality of soluble yarns. The retaining fabrics hold the ends of the loops during knitting. However, the loops are subsequently freed from the retaining fabric by immersing the entire fabric in a solution capable of dissolving the soluble yarns, i.e. the retaining fabric. The resulting product is a fiber string comprising a strong rope-like backbone having a plurality of yarn loops extending outwardly therefrom.

9 Claims, 4 Drawing Sheets

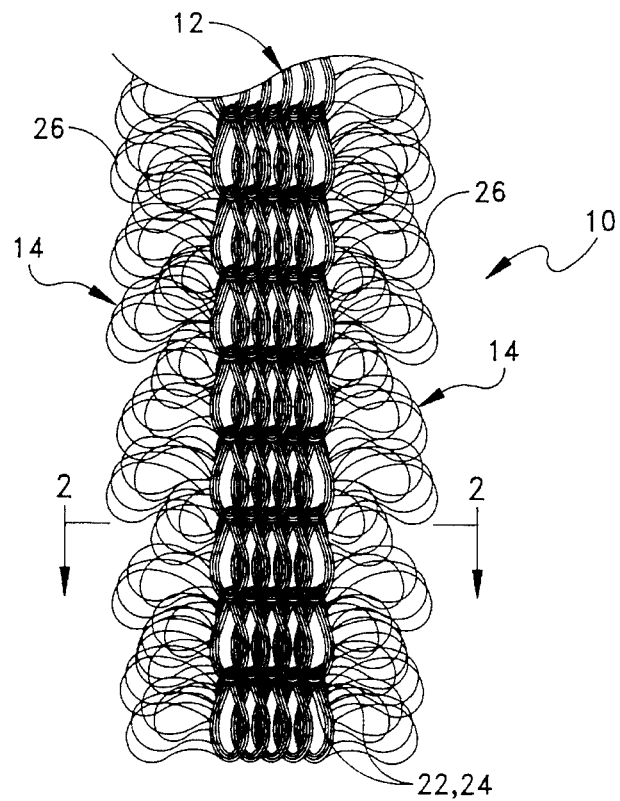
FIG. 1
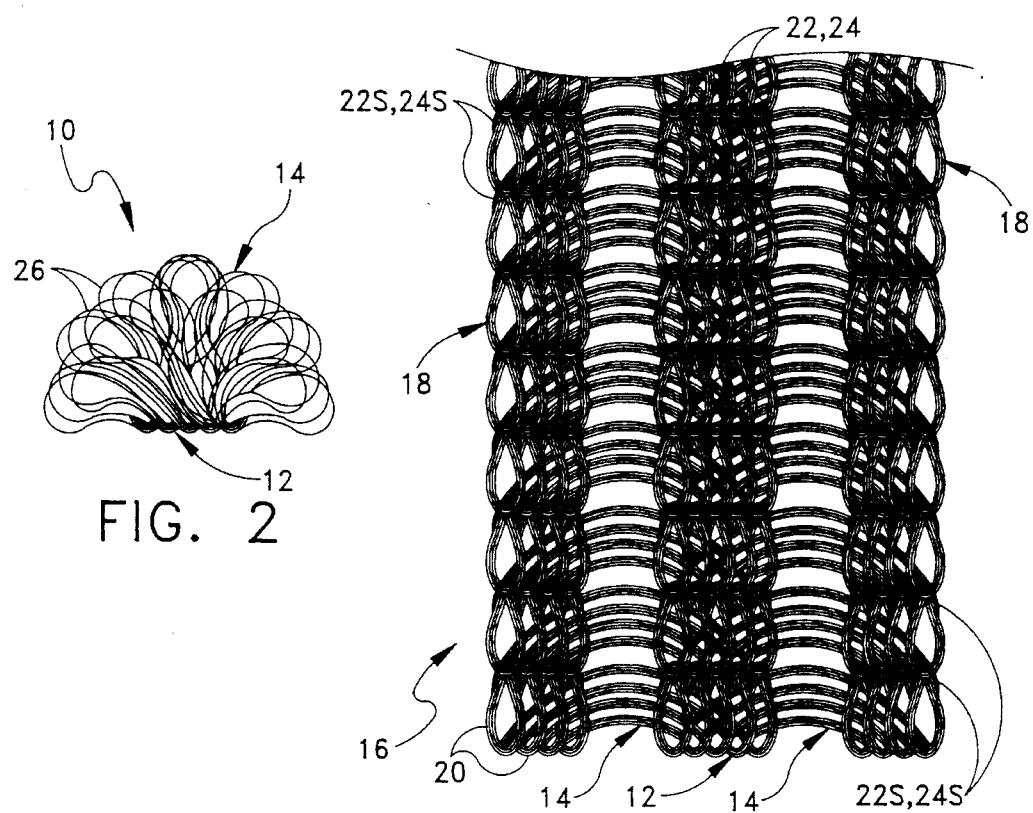
FIG. 2
FIG. 3

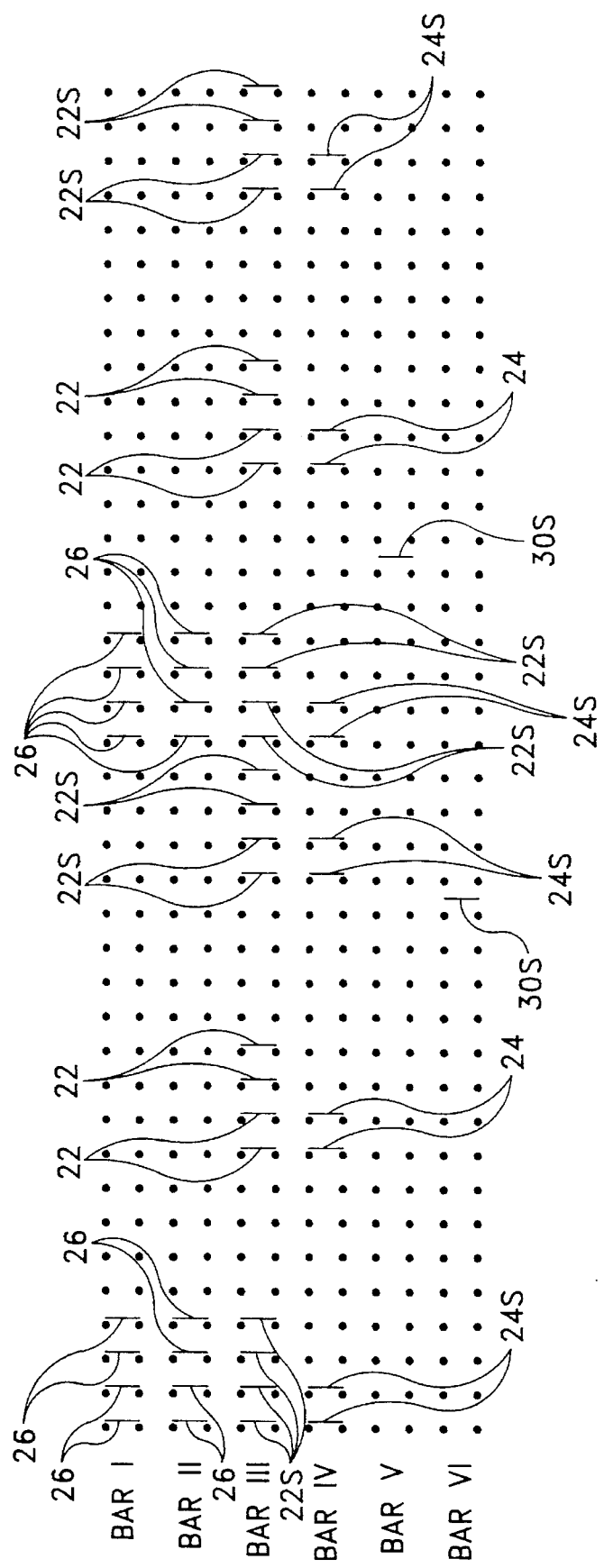

METHOD OF PRODUCING A FIBER STRING HAVING A PLURALITY OF TUFTS EXTENDING OUTWARDLY THEREFROM

BACKGROUND AND SUMMARY OF THE INVENTION

The instant invention relates to knitting methods and more particularly to a method of producing a fiber string having a plurality of flexible loops or tufts extending outwardly therefrom.

Fiber strings comprising a central rope-like backbone and having a plurality of flexible loops or tufts extending outwardly therefrom have heretofore been used as contact elements in waste water treatment apparatus. For example, a fiber string of this type is illustrated and described in U.S. Pat. No. 4,422,930. In the '930 patent, the fiber string is suspended on a frame system for presentation to an effluent flow.

Although the presently available contact elements are effective, there is one major drawback: the contact elements are very expensive to produce. While the contact elements do not need to be repeatedly replaced, a significant amount of the fiber string material is nevertheless required in maintaining such a treatment system.

Accordingly, among the several objects of the instant invention is the provision of a method for inexpensively producing a contact element using conventional knitting apparatus.

The instant invention provides a novel method of producing a fiber string contact element comprising the steps knitting a loop pile fabric with non-soluble and soluble yarns, and then dissolving the soluble yarns in a solution to release the knitted loops. More specifically, the loop pile fabric is formed with a central rib, or backbone, knitted from a plurality of non-soluble yarns, a plurality of loops knitted into the central rib such that terminal ends thereof extend outwardly from opposite sides of the central rib, and a retaining rib respectively knitted into the terminal ends of the loops on each side of said central rib. The loops are knitted from a plurality of non-soluble yarns, and the retaining ribs are knitted from a plurality of soluble yarns. The retaining ribs hold the ends of the loops during knitting. However, the ends of the loops are subsequently freed from the retaining ribs after knitting by immersing the entire fabric in a solution capable of dissolving the soluble yarns, i.e. the retaining ribs. The resulting product is a fiber string comprising a strong rope-like backbone having a plurality of yarn loops extending outwardly therefrom.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a rear view of the fiber string produced according to the method of the instant invention;

FIG. 2 is a cross-sectional view thereof taken along line 2—2 of FIG. 1;

FIG. 3 is a rear view of a loop pile precursor fabric used to form the fiber string illustrated in FIG. 1;

FIG. 7 is a spacing pattern of the individual yarns for knitting two side-by-side strips of the loop pile fabric.

DESCRIPTION OF THE PREFERRED EMBODIMENT

Figure 4:
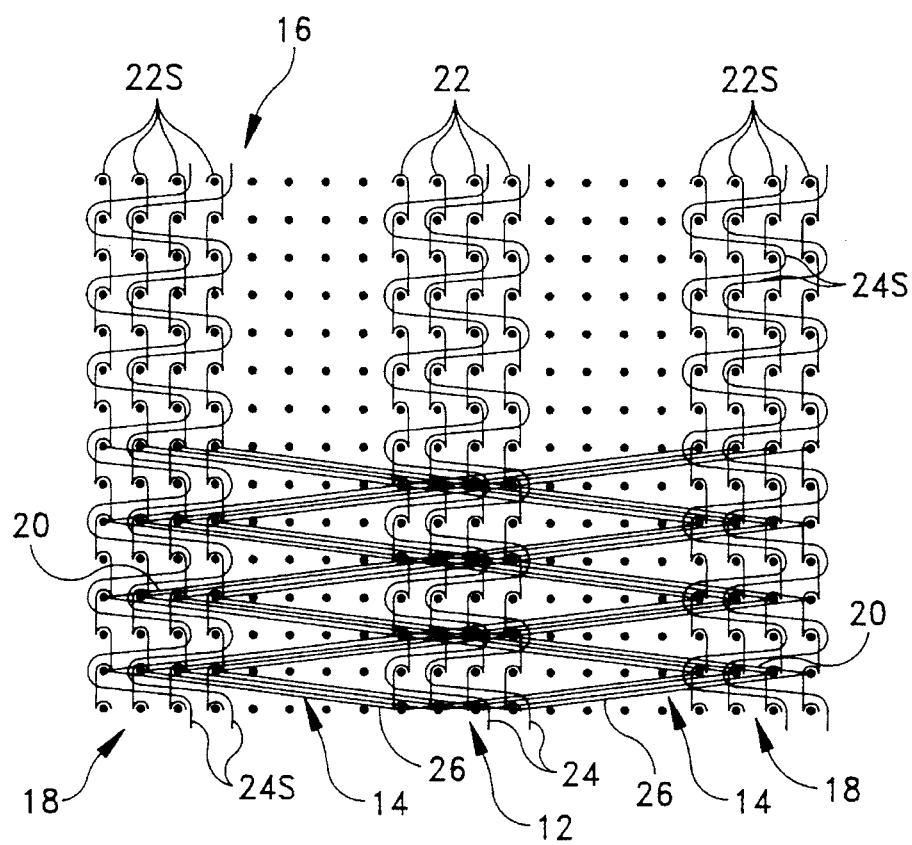
FIG. 4 is an enlarged view of the knitting pattern of the loop pile fabric during knitting.

Referring now to the drawings, the fiber string produced by the method of the instant invention is illustrated and generally indicated at 10 in FIGS. 1 and 2. As will hereinafter be more fully described, fiber string 10 comprises a backbone generally indicated at 12 and a plurality of loops, or tufts 14, extending outwardly from the backbone 12.

The instant method for producing fiber string 10 generally comprises the steps of knitting a loop pile fabric with selectively placed soluble yarns, such as water soluble yarns, and then dissolving the soluble yarns in a solution to release the knitted loops. More specifically, the loop pile fabric includes a base fabric and a plurality of loops knitted into the base fabric such that terminal ends thereof extend outwardly from the base fabric. The loop pile fabric further includes a retaining fabric knitted into the terminal ends of the loops. The base fabric and the loops are knitted from a plurality of non-soluble yarns, such as high-tenacity polyester yarns. However, the retaining fabric is knitted from a plurality of soluble yarns, such as hot water soluble yarns. The knitted loop pile fabric is then immersed in a solution, such as hot water, to dissolve the soluble yarns and release the ends of the loops. The resulting fabric comprises a ribbon-like structure having a base fabric with a plurality of free loops extending outwardly therefrom.

EXAMPLE

The method of the instant invention will hereinafter be more fully described by way of the following illustrative example, in which fiber string 10, illustrated in FIGS. 1 and 2, will be produced.

Figure 5:
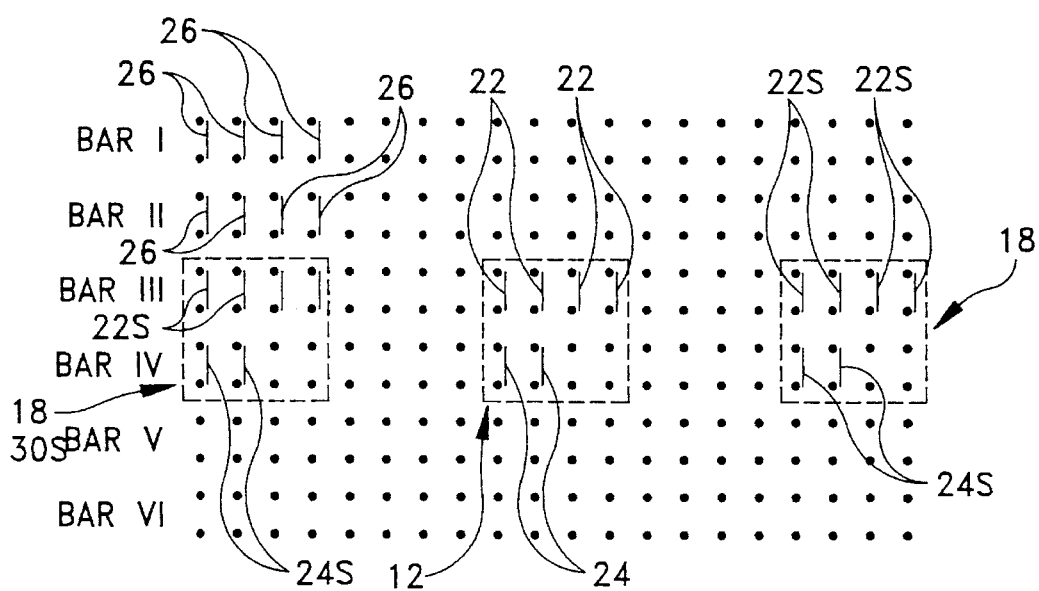
FIG. 5 is a spacing pattern of the individual yarns on the knitting bars of a single needle raschel knitting apparatus for knitting the loop pile fabric.

The first step in forming fiber string 10 is to knit a loop pile fabric as generally indicated at 16 in FIG. 3. More specifically, loop pile fabric 16 has a knitting pattern as illustrated in FIG. 4. Loop pile fabric 16 is preferably knitted on a single needle raschel knitting apparatus having a yarn position and spacing configuration as illustrated in FIG. 5, and a knitting bar movement pattern as listed in Table 1 below:

TABLE 1

| BAR I | BAR II | BAR III | BAR IV |
|---|---|---|---|
| 32,34 | 2,0 | 2,0 | 6,6 |
| 16,18 | 16,18 | 0,2 | 0,0 |
| 2,0 | 32,34 | 2,0 | 6,6 |
| 16,18 | 16,18 | 0,2 | 0,0 |

Table I represents the reciprocal back and forth movements of the knitting bars which hold the yarns to be knitted. FIG. 5 represents the spacing of the individual yarns positioned on each of the knitting bars.

Single needle bar raschel knitting machines as used in the instant invention are well known in the art. Therefore, no further description of the raschel knitting apparatus itself will be set forth. The set up configurations as described in Table I and FIG. 5 are believed to contain adequate information for one familiar with a raschel type knitting apparatus to set up the raschel machine and produce loop pile fabric 16.

Referring now to FIGS. 3–5, the loop pile fabric is formed with a central rib or backbone generally indicated at 12, a plurality of loops generally indicated at 14, and spaced opposing strips of retaining fabric generally indicated at 18. The loops 14 are knitted into central rib 12 such that their terminal ends 20 (FIG. 4) extend outwardly from opposite sides of the central rib 12. Strips of retaining fabric 18 are respectively knitted into the terminal ends 24 of the loops 20 on each side of the central rib 18. The central rib 12 and retaining fabric strips 18 are formed using a conventional chain stitch with four base yarns 22 and two inlay yarns 24. The loops 14 are formed from eight individual yarns 26 divided into two groups of four yarns which are zig-zagged back and forth during knitting. The eight loop yarns 26 are simultaneously knitted into the central rib 12 such that the terminal ends 20 of the loop yarns 26 loop outwardly to the sides of the central rib 12. This procedure is typically called gymping in the formation of loop pile fabrics. The terminal ends 20 of the loop yarns are knitted into stips of retaining fabric 18 in a conventional manner. The yarns 22, 24 and 26 which form the central rib 12, and the loops 14 comprise high-tenacity polyester yarns. However, the yarns 22S and 24S which form the retaining fabric 18 comprise hot water soluble yarns, such as 200SX/40FIL SOLVRON yarns. (SOLVRON is a registered trademark of Nitivy Co. Ltd., Tokyo, Japan.)

The resulting fabric (FIG. 3) has a generally flat ribbon-like configuration. In this connection, the strips of retaining fabric 18 are operative for holding the ends of the loops 14 during knitting. However, the ends of the loops 14 are subsequently freed from the retaining fabric 18 after knitting by immersing loop pile fabric 16 in a solution capable of dissolving soluble yarns 22S and 24S. Since the instant embodiment utilizes water soluble yarns, the fabric 16 is immersed in hot water to dissolve the yarns. While the retaining fabric 18 is dissolved, the central rib 12 and loops 14 remain intact. The resulting product is the fiber string as illustrated in FIGS. 1 and 2 comprising a central rib, or backbone 12, and a plurality of yarn loops or tufts 14 extending outwardly therefrom.

Figure 6:
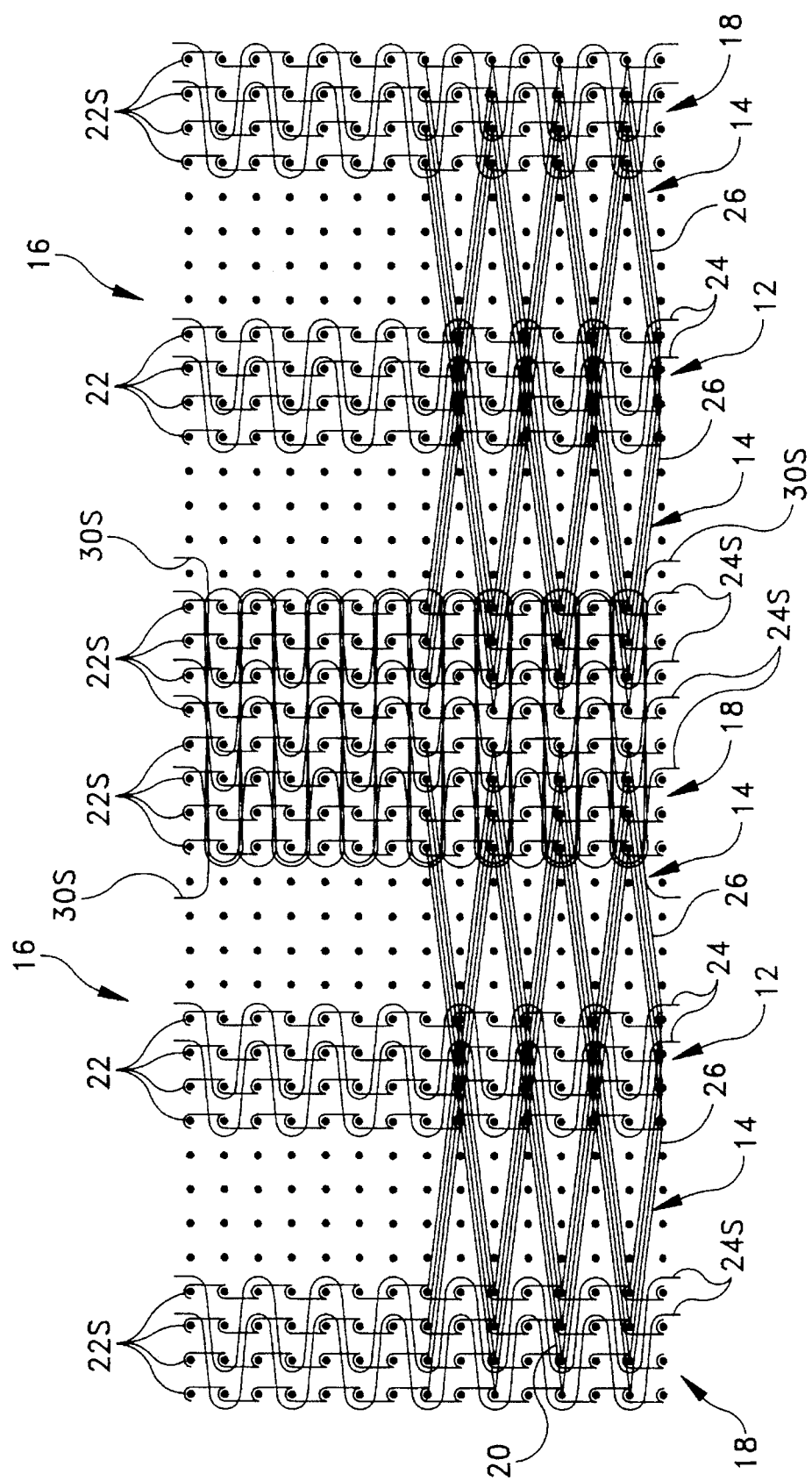
FIG. 6 is an enlarged view of the knitting pattern of two side-by-side strips of the loop pile fabric during knitting.

Referring now to FIGS. 6 and 7, the set up configuration for simultaneously forming two side-by-side rows of loop pile fabric 16 is illustrated. The set-up for the threads 22, 24, and 26 is virtually identical with the exception of two additional soluble threads 30S. Threads 30S are mounted on bars V and VI and are provided for knitting the two adjacent strips of retaining fabric 18 of the two fabrics 16. The knitting bar movement pattern is listed below in Table 2:

TABLE 2

| BAR I | BAR II | BAR III | BAR IV | BAR V | BAR VI |
| --- | --- | --- | --- | --- | --- |
| 32,34 | 2,0 | 2,0 | 6,6 | 20,20 | 0,0 |
| 16,18 | 16,18 | 0,2 | 0,0 | 0,0 | 20,20 |
| 2,0 | 32,34 | 2,0 | 6,6 | 20,20 | 0,0 |
| 16,18 | 16,18 | 0,2 | 0,0 | 0,0 | 20,20 |

Threads 30 are passed back and forth through the weave to tie the two adjacent retaining strips 18 together. When the fabric 16 is subsequently immersed in water the soluble threads 30 also dissolve resulting in two separate fiber strings 10.

It can therefore be seen that the instant invention provides a novel and inexpensive method of producing a contact element which is suitable for use in waste water treatment processes. The use of soluble yarns in a conventional knitting process allows a unique pile fabric to be manufactured using conventional knitting techniques. The pile fabric is then immersed in water to dissolve selected soluble threads to release a plurality of loops or tufts. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

We claim:

1. A method of producing a fiber string having a plurality of loops extending outwardly therefrom comprising the steps of knitting a loop pile fabric having a central rib knitted from a plurality of non-soluble yarns, knitting a plurality of loops from the non-soluble yarns into the central rib such that terminal ends thereof extend outwardly from opposite sides of the central rib, and knitting a strip of retaining fabric of soluble yarns into the terminal ends of the loops on each side of the central rib, the step further comprising knitting the loop pile fabric on a single needle rachel knitting apparatus.

2. The method of claim 1 further comprising the step of immersing said loop pile fabric in a solution for dissolving said soluble yarns.

3. In the method of claim 1, said soluble yarns comprising water soluble yarns.

4. The method of claim 1 wherein said step of knitting said central rib and said strips of retaining fabric forms a chain stitch.

5. The method of claim 4 wherein said chain stitch includes an inlay yarn.

6. A method of producing a fiber string having a plurality of loops extending outwardly from opposing sides thereof comprising the steps of simultaneously knitting a central rib of fabric, and two outer retaining ribs of fabric, each of said two outer retaining ribs of fabric extending in spaced parallel relation to the central rib on a respective side thereof, said method further comprising the step of simultaneously knitting a plurality of loop yarns into the central rib of fabric and the retaining ribs of fabric by moving said loop yarns between the respective ribs of fabric in an overlapping motion such that the loop yarns pass from one retaining rib of fabric through the central rib of fabric to the other retaining rib of fabric and then back through the central rib of fabric in a zig-zag pattern, securing said loop yarns into the stitch pattern of the central rib of fabric and the outer retaining ribs of fabric, said central rib of fabric and said loop yarns comprising non-soluble yarns, said retaining ribs of fabric being knitted from soluble yarns, said method further comprising the step of dissolving said soluble yarns of said retaining ribs of fabric to release the outer terminal ends of said loop yarns, said loop yarns thus being anchored in the central rib of fabric and forming loops which extend outwardly from the sides thereof.

7. In the method of claim 6, said soluble yarns comprising water soluble yarns.

8. In the method of claim 6, said central rib of fabric and said ribs of retaining fabric being formed by a chain stitch.

9. The method of claim 8 wherein said chain stitch includes an inlay yarn.

* * * * *